United States Patent Office 3,396,549
Patented Aug. 13, 1968

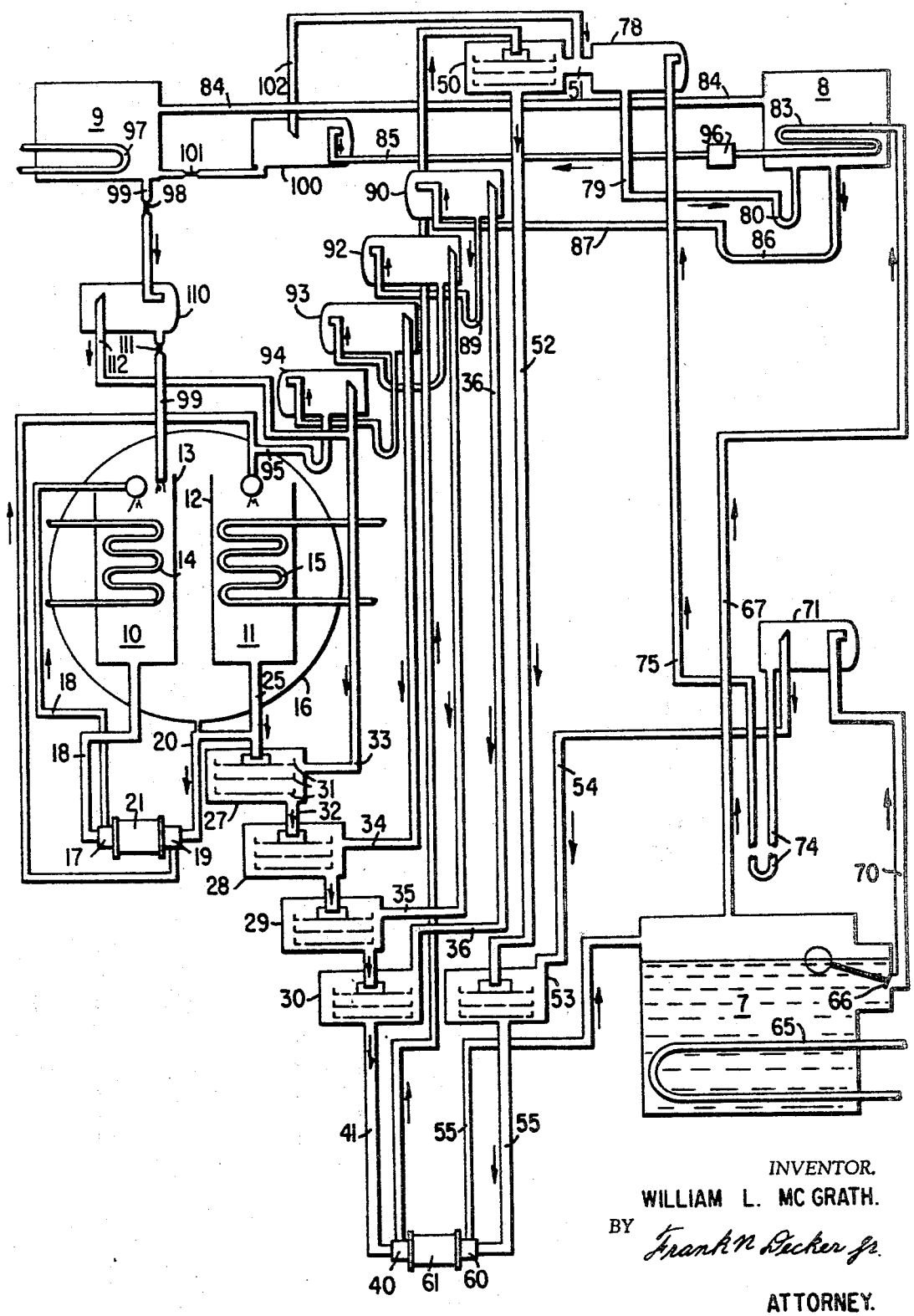

3,396,549
MULTIPLE-EFFECT ABSORPTION REFRIGERATION SYSTEMS
William L. McGrath, Syracuse, N.Y., assignor to Carrier Corporation, Syracuse, N.Y., a corporation of Delaware
Filed May 31, 1967, Ser. No. 642,367
7 Claims. (Cl. 62—101)

ABSTRACT OF THE DISCLOSURE

A double-effect absorption refrigeration system having a primary absorber, a primary evaporator, a high pressure generator, a low pressure generator, a high pressure condensing section, and a low pressure condenser, connected to provide refrigeration. A plurality of auxiliary absorber stages are connected in a weak solution line between the primary absorber and the high pressure generator. A plurality of auxiliary evaporator stages are connected in an intermediate solution line between the high pressure generator and the low pressure generator, and a plurality of auxiliary evaporator stages are connected in a strong solution line between the low pressure generator and the primary absorber. Stages of the auxiliary evaporators are connected by refrigerant vapor passages with the auxiliary absorbers so as to simultaneously concentrate and cool absorbent solution leaving the generator while also simultaneously heating and diluting weak solution passing to the generators. A high pressure refrigerant economizer is employed to evaporate a portion of the refrigerant condensed in the high pressure condenser to cool the remaining refrigerant therein, and the refrigerant vapor is passed to one of the auxiliary absorbers to further dilute and cool solution therein. A low pressure refrigerant economizer is employed to evaporate a portion of the refrigerant condensed in the low pressure condenser to cool the remainder thereof, and the vapor formed therein is passed to another auxiliary absorber to cool and dilute weak solution.

Cross references to related applications

This application claims subject matter disclosed in my co-pending application Ser. No. 642,369 filed concurrently herewith.

Background of the invention

This invention relates to multiple-effect absorption refrigeration systems wherein the heat of the vapor formed in the high pressure generator is re-used to further concentrate the absorbent solution in the low pressure generator. It is well known that a double-effect ssytem is capable of providing high efficiency compared to conventional absorbent refrigeration cycles. However, previously known double-effect cycles have required relatively high solution temperatures and absorbent concentrations in the high pressure generators in order to achieve a worthwhile gain in cycle efficiency. The corrosion of metal parts is greatly accelerated at high solution temperatures and high absorbent concentrations, when employing a lithium bromide absorbent solution and previous double-effect systems have required expensive materials to overcome this limitation. Lower generator temperatures and lower absorbent concentrations have been resorted to in order to reduce corrosion difficulties, but such systems must pay the penalty of increased absorber heat transfer surface and low efficiency, thereby offsetting, to some extent, the advantage of the double-effect system over conventional single-effect systems.

Furthermore, prior double-effect absorption refrigeration systems have suffered the cost disadvantage of greatly increased heat transfer surface requirements in the heat exchangers used in the system. These heat exchangers must be made large compared with conventional systems because of the increased quantities of heat which must be transferred and because high efficiency of the cycle is dependent on the heat exchangers being designed for a relatively close temperature approach.

Thus, prior double-effect systems have not only suffered from less than optimum efficiency, but also from greatly increased initial equipment cost due to the enormous heat transfer surface necessary to achieve satisfactory efficiency.

In accordance with this invention, there is provided a double-effect absorption refrigeration system which achieves the theoretically attainable efficiency without the necessity of employing either reduced solution concentrations, high generator temperatures, or large conventional heat transfer surface.

Summary of the invention

In accordance with this invention, a double-effect absorption refrigeration machine is provided which employs an auxiliary refrigerant evaporator in the strong solution passage through which strong absorbent solution passes from the low pressure generator to the primary absorber. The refrigerant evaporator preferably comprises a plurality of serially connected auxiliary evaporator stages in the strong solution passage for concentrating and simultaneously cooling the strong solution after it leaves the low pressure generator. In addition, an auxiliary absorber is provided in the weak solution passage through which weak solution is passed from the primary absorber to the high pressure generator. The refrigerant vapor evaporated in the auxiliary evaporator is absorbed into the weak solution passing to the high pressure generator so that the weak solution is simultaneously diluted and preheated. The heating and dilution of the weak solution reduces the heat input required to the high pressure generator, and the required generator temperature, because a greater quantity of refrigerant vapor is boiled from the diluted weak solution at a lower temperature than would otherwise be required in the generator. Preferably, the low pressure auxiliary absorber comprises a plurality of serially connected stages of successively increasing pressure and successively decreasing vertical elevations corresponding to similar pressure stages of the low pressure auxiliary evaporator. The low pressure auxiliary evaporator stages are also preferably disposed at successively lower vertical elevations and are joined by solution loops through which strong absorbent solution is concentrated as it passes to the primary absorber.

Brief description of the drawing

The drawing illustrates a schematic cross-section through a double-effect absorption refrigeration system in accordance with a preferred embodiment of this invention.

Description of the preferred embodiment

Referring to the drawing, there is shown a multiple-effect absorption refrigeration system of a type which employs two effects and may use water as a refrigerant and an aqueous solution of hygroscopic salt, such as lithium bromide, as an absorbent. Various additives may be added to the solution, such as 2-ethyl-n-hexanol, to enhance heat transfer, and lithium hydroxide to inhibit corrosion. As used herein, "weak" solution refers to a solution weak in absorbent salt and absorbing power, and "strong" solution refers to a solution strong in absorbent salt and absorbing power.

The double-effect absorption system comprises a high pressure generator 7, a low pressure generator 8 having a high pressure condenser section associated therewith, a low pressure condenser 9, a primary absorber 11 and a primary evaporator 10.

Primary evaporator 10 and primary absorber 11 are preferably disposed within a single low pressure shell 16. An internal partition 12 forms a primary absorber chamber and an internal partition 13 forms a primary evaporator chamber within shell 16. A plurality of evaporator heat exchange tubes 14 are arranged within partition 13 for passage of a fluid medium, such as water, to be chilled by the refrigeration system. A plurality of absorber heat exchange tubes 15 are disposed within partition 12 and arranged for passage of a cooling medium, such as water, to a suitable heat rejection location, such as a conventional cooling tower.

Liquid refrigerant is distributed over evaporator tubes 14 and is evaporated to cool the fluid passing through the evaporator tubes. The unevaporated refrigerant liquid passes from the bottom of a sump formed by partition 13 through an evaporator recirculation pump 17 and recirculation passage 18 from which it is again distributed over evaporator tubes 14.

Cool, concentrated, strong absorbent solution is distributed over absorber tubes 15 and cooled by heat exchange with the medium passing therethrough. A portion of the absorbent solution collected in the bottom of a sump formed by partition 12 is recirculated by absorber recirculation pump 19 through recirculation line 20 from which it is again discharged over absorber tubes 15. A single electric motor 21 may operate both pumps 17 and 19.

The absorbent solution in primary absorber 11 is diluted by absorption of refrigerant vapor therein from primary evaporator 10. Cold, moderately weak absorbent solution passes through moderately weak solution passage 25 from the bottom of partition 12 and shell 16 into the first stage 27 of a low pressure auxiliary absorber. From there, the moderately weak solution passes into second stage 28, third stage 29, and fourth stage 30 of the low pressure auxiliary absorber. Each of the stages may be substantially similar and preferably comprises a plurality of perforated liquid distribution pans 31 arranged for cascading flow of liquid from one pan to the succeeding pan throughout each stage. A connecting passage 32 passes solution from first stage 27 to second stage 28 and similar connecting passages are provided between the succeeding stages. A refrigerant vapor inlet passage 33 admits refrigerant vapor to be absorbed into first stage 27, and similar refrigerant vapor inlet passages 34, 35 and 36 admit refrigerant vapor into their respective succeeding stages of the low pressure auxiliary absorber.

A low pressure weak solution pump 40 passes warm weak solution from the last stage 30 of the low pressure auxiliary absorber through weak solution passage 41 to the first stage 50 of a high pressure auxiliary absorber. First stage 50 of the high pressure auxiliary absorber may be similar in construction to first stage 27 of the low pressure auxiliary absorber and is provided with a refrigerant vapor inlet passage 51 to admit refrigerant vapor into the stage for absorption into absorbent solution therein. A connecting passage 52 passes solution from first stage 50 to a second stage 53 of the high pressure auxiliary absorber. Second stage 53 is provided with a refrigerant vapor passage 54 for admitting refrigerant vapor into the stage for absorption into absorbent solution therein. The resulting very weak, very warm, absorbent solution is passed through very weak solution line 55 by very weak solution pump 60 into high pressure generator 7 for concentration therein. Pumps 40 and 60 may be driven by a single electric motor 61.

High pressure generator 7 includes generator heat exchange tubes 65 for passing steam in heat exchange relation with absorbent solution therein. Other heating media may be employed, or alternatively, the generator may be directly fired by a combustible gas. The absorbent solution in generator 7 is boiled to vaporize refrigerant and to concentrate the solution. Hot intermediate strength absorbent solution passes from high pressure generator 7 through float valve 66 and intermediate solution passage 70, to the first stage 71 of a high pressure auxiliary evaporator.

Stage 71 may comprise a hollow vessel in which the incoming solution is discharged against one wall thereof to prevent carryover of liquid droplets into the vapor outlet passage. Refrigerant vapor passage 54 terminates in the vapor space within high pressure auxiliary evaporator stage 71. This passage conducts refrigerant vapor evaporated in high pressure auxiliary evaporator first stage 71 to the last stage 53 of the high pressure auxiliary absorber.

Intermediate solution passes from the first stage 71 of the high pressure auxiliary absorber through a solution trap 74 in passage 75 to second stage 78 of the auxiliary high pressure evaporator, which may be similarly constructed to that of the first stage 71. Refrigerant vapor passage 51 conducts refrigerant vapor from second stage 78 of the auxiliary high pressure evaporator to first stage 50 of the high pressure auxiliary absorber.

Refrigerant vapor is evaporated from the intermediate absorbent solution in the stages of the high pressure auxiliary evaporator, thereby simultaneously concentrating and cooling the hot intermediate strength solution to form moderately hot, concentrated intermediate solution. The concentrated intermediate solution passes through intermediate solution passage 79 and solution trap 80 into low pressure generator 8.

The various solution traps, such as traps 74 and 80, are designed to have a vertical height, such that the level of solution in the leg thereof connecting with the next lower pressure stage, balances the solution level and the pressure difference from the previous higher pressure zone to prevent vapor from passing between the stages.

Low pressure generator 8 comprises a combined generator-condenser and is provided with heat exchange tubes 83 which form a high pressure condenser section therein. The hot refrigerant vapor formed in high pressure generator 7 passes through high pressure refrigerant vapor passage 67 and heat exchange tubes 83 to boil the solution in the lower pressure generator while condensing the vapor within heat exchange tubes 83. The refrigerant vapor formed in the low pressure generator passes through low pressure refrigerant vapor passage 84 to low pressure condenser 9. The strong absorbent solution formed in low pressure generator 8 passes through solution trap 86 and strong solution passage 87 to the first stage 90 of an auxiliary low pressure evaporator. The refrigerant condensed in high pressure condenser tubes 83 passes through steam trap 96 to low pressure condenser 9.

First stage 90 and the succeeding stages of the low pressure auxiliary evaporator may be constructed similarly to first stage 71 of the high pressure auxiliary evaporator. Refrigerant vapor passage 36 extends from the last stage 30 of the low pressure auxiliary absorber and terminates in the vapor space in first stage 90 of the low pressure auxiliary evaporator to conduct refrigerant vapor formed in first stage 90 to last stage 30. The strong absorbent solution passes from first stage 90 of the low pressure auxiliary evaporator through solution trap 89 into second stage 92 in which additional refrigerant is evaporated from the solution. The solution then passes into succeeding stages 93 and 94 where still further evaporation of refrigerant vapor takes place. Second stage 92 of the low pressure auxiliary evaporator is in vapor communication with third stage 29 of the low pressure auxiliary absorber through refrigerant vapor passage 35, and similarly third stage 93 and fourth stage 94 are in communication with second stage 28 and first stage 27, through refrigerant vapor passages 34 and 33 respectively.

The concentrated strong absorbent solution passes from last stage 94 through a solution trap into concentrated strong solution line 95 from which it is discharged over absorber heat exchange tubes 15 in primary absorber 11.

The low pressure refrigerant vapor passes from low pressure refrigerant vapor passage 84 into low pressure condenser 9 and is condensed therein by heat exchange with a suitable cooling medium passing through condenser heat exchange tubes 97. The cooling medium rejects heat from low pressure condenser 9 to a suitable location, such as a cooling tower. Also, high pressure liquid refrigerant passes from high pressure refrigerant liquid passage 85 into low pressure condenser 9 and is partially evaporated therein by flashing, thereby cooling the remainder thereof upon being discharged in the low pressure condenser. The resulting vapor is recondensed in condenser 9.

Condensed refrigerant passes from low pressure condenser 9 through restriction 98 in low pressure refrigerant passage 99 and is discharged over evaporator heat exchange tubes 14 in primary evaporator 10.

It is preferred to employ a high pressure refrigerant economizer 100 in the high pressure refrigerant passage 85. High pressure refrigerant economizer 100 may comprise a vessel similar in construction to the auxiliary evaporator stages. A portion of the liquid refrigerant passing to the high pressure refrigerant economizer is evaporated therein to cool the remaining liquid refrigerant. The refrigerant vapor formed in the high pressure economizer passes through refrigerant vapor passage 102 into refrigerant vapor passage 51 and is absorbed in first stage 50 of the high pressure auxiliary absorber. Thus, the warm refrigerant liquid from the high pressure condenser is cooled prior to passing to the primary absorber and the refrigerant vapor formed in the high pressure economizer is absorbed into weak solution to heat and dilute the weak solution. The cooled high pressure refrigerant liquid passes through a high pressure refrigerant liquid restriction 101 to low pressure condenser 9. Steam trap 96 and restriction 101 maintain a pressure zone in the high pressure refrigerant economizer 100 intermediate the pressures in high pressure condenser 8 and low pressure condenser 9.

It is also preferred to employ a low pressure refrigerant economizer 110 in low pressure refrigerant liquid passage 99. Low pressure refrigerant economizer 110 is similar in construction to economizer 100 and vapor formed therein passes through vapor passage 112 and passage 33 into first stage 27 of the low pressure absorber. Low pressure refrigerant restriction 111 and restriction 98 are disposed in the inlet and discharge passages associated with low pressure refrigerant economizer 110 to maintain a pressure zone therein, intermediate the pressures in low pressure condenser 9 and primay evaporator 10. A portion of the low pressure liquid refrigerant is evaporated in low pressure refrigerant economizer 110 to cool the remaining refrigerant prior to its discharge over primary evaporator heat exchange tubes 14. The refrigerant vapor thus formed is absorbed into and dilutes and heats the cold moderately weak solution in first stage 27 of the low pressure auxiliary absorber.

In operation, the pressures in serially connected low pressure auxiliary absorber stages 27, 28, 29 and 30 successively increase in the direction of solution flow therethrough from primary absorber 11 toward the high pressure auxiliary absorber and high pressure generator 7. The low pressure auxiliary absorber stages form successively increasing pressure zones intermediate the pressures in primary absorber 11 and first stage 50 of the high pressure auxiliary absorber.

Similarly, the pressure in second stage 53 of the high pressure auxiliary absorber is greater than the pressure in first stage 50 thereof. Both serially connected stages form successively increasing pressure zones intermediate the pressure in last stage 30 of the low pressure auxiliary absorber and the high pressure generator 7, in the direction of solution flow therethrough from primary absorber 11 to high pressure generator 7.

In a typical system, moderately weak (60%), cold (106° F.), absorbent solution from primary absorber 11 is successively diluted and heated in the stages of the low pressure auxiliary absorber by absorption of refrigerant vapor therein, to form warm (156° F.), weak (58.8%) solution which passes to the high pressure auxiliary absorber. The warm weak solution is successively further diluted and further heated by absorption of refrigerant vapor therein, as it passes through the stages of the high pressure auxiliary absorber to form very warm (245° F.), very weak (56.7%) absorbent solution which passes to high pressure generator 7.

The quantity of refrigerant which can be formed by boiling weak solution in the high pressure generator at a given temperature is greatly increased because the solution passed thereto is very weak in absorbent salt. Thus, a low generator temperature becomes feasible by use of this invention. In addition, very weak solution results in a much lower corrosion rate of metal parts in the high pressure generator than would occur with stronger solution at the same temperature level. It is also important to note that while the auxiliary absorbers perform both a dilution and a heating function to make these advantages possible, they achieve this result without employing expensive heat exchange tube surface and so possess a significant cost advantage over conventional solution heat exchangers.

The hot (307° F.), intermediate strength (58.7%) absorbent solution from the high pressure generator is further concentrated and cooled as it passes through the stages of the high pressure auxiliary evaporators by the evaporation of refrigerant vapor from the solution. At the same time, not only is the concentration of the solution increased, but its temperature is reduced so that only moderately hot (220° F.) but concentrated (60.7%) intermediate solution passes into the low pressure generator. The absorbent solution is further cooled and concentrated by evaporation of refrigerant therefrom in the low pressure generator.

The moderately cool (190° F.), strong solution (63.3%) is serially passed through the stages of the low pressure auxiliary evaporator to the primary absorber. Still further, refrigerant vapor is evaporated from the strong solution in the low pressure auxiliary evaporator stages. The solution is further cooled, due to the evaporation of refrigerant therefrom and the cool (145° F.) concentrated strong solution (64.5%) is passed to the primary absorber to absorb refrigerant vapor therein.

The use of auxiliary evaporators for concentrating the intermediate and strong solutions provide important advantages over conventional systems. First, the auxiliary evaporators serve to concentrate the intermediate and strong solutions so that high concentrations and high generator temperature is not required to provide a normal concentration of absorbent solution entering the absorber. Also, this concentrating of the adsorbent results in a drastic reduction in absorber heat transfer surface required due to a lower absorber vapor pressure being produced for a given area of absorber heat transfer surface. Second, the auxiliary evaporators cool the solution by evaporation of refrigerant from solution, thereby eliminating the necessity for conventional heat transfer surface heat exchangers. Third, the auxiliary evaporators provide refrigerant vapor to heat and dilute absorbent solution passing to the high temperature generator in order to make it possible to boil the solution at a relatively low temperature compared to conventional double-effect systems.

It will be seen that the cycle described achieves all the advantages of a conventional double-effect absorption refrigeration system in a significantly improved manner. Specifically, the temperature in the high temperature generator may be greatly reduced compared to equivalent conventional systems, because first the absorbent solution is diluted before entering the generator, and secondly, it is further concentrated before entering the low pressure generator. Similarly, unlike conventional double-effect absorption systems, the strong solution leaving the low pressure generator is further concentrated to provide more absorbing power before it enters the primary absorber.

It is possible to employ a low pressure auxiliary evaporator having a single stage and a low pressure auxiliary absorber having a single stage to achieve many of the advantages described for this invention in a double-effect system. However, it is greatly preferred that the low pressure auxiliary evaporator and auxiliary absorber have multiple stages, as illustrated in the drawing. By utilizing multiple low pressure evaporating zones and multiple low pressure absorbing zones, a substantially greater amount of concentration and dilution of strong and weak solutions respectively can be achieved. Furthermore, the amount of heat transferred between the strong and weak solutions is significantly increased by employing successive stages so that the efficiency of the machine is materially improved.

It is also preferred that each of the stages of the low pressure auxiliary absorber be disposed in the weak solution passage at successively lower vertical elevations, as shown in the drawing, so that weak solution can pass therethrough by gravity. It will be understood that the internal construction of each stage is such as to provide an effective liquid seal between it and the succeeding seal, so as to prevent vapor passage between the stages. Thus, the stages of the low pressure auxiliary absorber comprise serially connected absorbing zones of successively higher pressure, higher temperature, and lower solution concentration in the direction of solution flow therethrough from the primary absorber to the high pressure generator.

Likewise, it is also preferred that each of the stages of the low pressure evaporator be disposed in the strong solution passage at a successively lower vertical elevation in the direction of solution flow therethrough from the low pressure generator to the primary absorber. Thus, the stages form serially-connected refrigerant evaporating zones of successively lower pressure, lower temperature, and lower elevation in the direction of solution flow. Passage of vapor between the stages is prevented by making the legs of the solution loops, through which the strong solution flows, of sufficient vertical height so that the column of solution in the shorter leg balances by the difference in the pressures between succeeding stages. The differences in vertical elevation between the stages allow gravity flow of solution to the primary absorber upon shutdown and start-up of the system and assists flow during operation thereof.

While the stages of the auxiliary evaporators and auxiliary absorbers may take the form of separate vessels, as shown in the drawing, it is feasible to incorporate them into a single vessel having suitable partitions and passages for the flow of solutions and vapor similar to a multiple flash evaporator. It is also feasible to include the refrigerant economizers within a vessel housing the auxiliary absorbers and evaporators, in which case, the refrigerant economizers may comprise open pans in an appropriate stage of an auxiliary absorber through which the refrigerant flows. Likewise, the number of stages of auxiliary absorbers and evaporators may be varied to suit the cost and efficiency objectives of the system. Modifications may also be made in the internal construction of each of the stages to suit manufacturing convenience, and various other design and system variations may be made without departing from the principles of this invention. Also, the absorption refrigeration system may utilize more than two effects and consequently the terms "high pressure," "low pressure," "strong," "weak" and "intermediate" and other similar terms are used merely for clarity to distinguish relative relationship of the components, solutions, temperature or pressures and not as a limitation on the number of effects in the cycle.

Accordingly, this invention may otherwise be embodied in the scope of the following claims.

I claim:
1. An absorption refrigeration system comprising:
   (A) a primary absorber;
   (B) a primary evaporator;
   (C) a high pressure geneartor;
   (D) a low pressure generator having a high pressure condenser section associated therewithin;
   (E) a low pressure condenser;
   (F) weak solution passage means for passing weak absorbent solution from said primary absorber to said high pressure generator for concentration therein;
   (G) intermediate solution passage means for passing intermediate strength absorbent solution from said high pressure generator to said low pressure generator for further concentration therein;
   (H) strong solution passage means for passing strong absorbent solution from said low pressure generator to said primary absorber for absorption of refrigerant vapor therein;
   (I) high pressure refrigerant vapor passage means for passing high pressure refrigerant vapor formed in said high pressure generator through the high pressure condenser section of said low pressure generator for condensing said vapor and heating solution in said low pressure generator;
   (J) low pressure refrigerant vapor passage means for passing low pressure refrigerant vapor formed in said low pressure generator to said low pressure condenser for condensing said vapor;
   (K) refrigerant liquid passage means for passing condensed refrigerant from said low pressure condenser to said primary evaporator for evaporation therein; and
   (L) refrigerant vapor passage means for passing evaporated refrigerant from said primary evaporator to said primary absorber for absorption into absorbent solution;
wherein the improvement comprises:
   (M) a low pressure auxiliary absorber disposed in said weak solution passage between said primary absorber and said high pressure generator;
   (N) a low pressure auxiliary evaporator disposed in said strong solution passage between said low pressure generator and said primary absorber, for evaporating refrigerant from strong solution passing to said primary absorber to concentrate and cool said strong solution; and
   (O) a refrigerant vapor passage extending from said low pressure auxiliary evaporator to said low pressure auxiliary absorber, for passing refrigerant vapor evaporated in said low pressure auxiliary evaporator to said low pressure auxiliary absorber for absorption into weak solution therein, thereby diluting and heating weak solution passing to said high pressure generator.

2. An absorption refrigeration system as defined in claim 1 wherein:
   (A) said low pressure auxiliary evaporator comprises a plurality of serially connected stages of successively lower pressure disposed in said strong solution passage between said low pressure generator and said primary absorber;
   (B) said low pressure auxiliary absorber comprises a plurality of serially connected stages of successively higher pressure disposed in said weak solution passage between said primary absorber and said high pressure generator; and
   (C) said refrigerant vapor passage comprises a plurality of refrigerant vapor passages, each connecting a stage of said low pressure auxiliary evaporator with a corresponding pressure stage of said low pressure auxiliary absorber for the passage of refrigerant vapor from the stages of said low pressure auxiliary evaporator to the corresponding pressure stages of said low pressure auxiliary absorber.

3. An absorption refrigeration system as defined in claim 1 wherein:
   (A) said low pressure auxiliary evaporator comprises a plurality of serially connected stages of successively lower pressure disposed in said strong solution passage between said low pressure generator and said primary absorber, said serially connected stages being at successively lower physical elevations in the direction of strong solution flow therethrough from said high pressure generator toward said primary absorber to maintain a desired pressure difference between said stages;
   (B) said low pressure auxiliary absorber comprises a plurality of serially connected stages of successively higher pressure disposed in said weak solution passage between said primary absorber and said high pressure generator, said serially connected stages being disposed at successively lower physical elevations in the direction of weak solution flow through said auxiliary absorber from said primary absorber toward said high pressure generator to maintain a desired pressure difference between said stages and to induce gravity flow of absorbent solution between successive stages; and
   (C) said refrigerant vapor passage comprises a plurality of refrigerant vapor passages, each connecting a stage of said low pressure auxiliary evaporator with a corresponding pressure stage of said low pressure auxiliary absorber for the passage of refrigerant vapor from the stages of said auxiliary evaporator to the corresponding pressure stages of said auxiliary absorber.

4. An absorption refrigeration system as defined in claim 3 wherein adjacent stages of said low pressure auxiliary absorber are connected by liquid loops for passing strong solution between successive stages, said liquid loops including legs having a vertical height sufficient to balance the pressure differences between their respective adjacent auxiliary evaporator stages to maintain a vapor seal therebetween.

5. A method of producing refrigeration from an absorption refrigeration system having a primary absorber, a primary evaporator, a high pressure generator, a low pressure generator associated with a high pressure condenser, and a lower pressure condenser, operatively connected to form a multiple-effect absorption refrigeration system, the steps comprising:
   (A) evaporating refrigerant in the primary evaporator to provide cooling, and absorbing the evaporated refrigerant in an absorbent solution in said primary absorber, thereby forming weak absorbent solution;
   (B) heating said weak absorbent solution in the high pressure generator to form intermediate strength absorbent solution and high pressure refrigerant vapor;
   (C) heating intermediate strength solution in said low pressure generator by condensing high pressure refrigerant vapor in said high pressure condenser in heat exchange relation with intermediate strength solution in said low pressure generator to form strong absorbent solution and low pressure refrigerant vapor;
   (D) condensing said low pressure refrigerant vapor in said low pressure condenser and passing said condensed refrigerant to said primary evaporator;
   (E) passing said strong solution to said primary absorber for reabsorption of refrigerant vapor and passing condensed refrigerant vapor to said primary evaporator for reevaporation thereof;
   (F) evaporating refrigerant vapor from strong absorbent solution passing from said low pressure generator to said primary absorber, thereby concentrating and cooling said strong absorbent solution prior to passage thereof to said primary absorber; and
   (G) absorbing that refrigerant vapor which is evaporated from the strong solution passing from said low pressure generator to said primary absorber into weak absorbent solution passing out of said primary absorber prior to passage of said weak solution into said high pressure generator, thereby diluting and heating said solution prior to passage thereof to said high pressure generator.

6. The method of producing refrigeration as defined in claim 5 including the steps of:
   (A) serially passing strong absorbent solution from said low pressure generator to said primary absorber through a plurality of successively lower pressure refrigerant evaporating zones as said sarong solution is passed to said primary absorber, thereby successively concentrating and cooling the strong absorbent solution passing to said primary absorber; and
   (B) serially passing weak absorbent solution from said primary absorber to said high pressure generator through a plurality of successively higher pressure absorbing zones as said weak solution is passed to said high pressure generator, and successively absorbing refrigerant vapor evaporated in the corresponding pressure refrigerant evaporating zones into said weak solution in said absorbing zones, thereby diluting and heating weak absorbent solution passing to said high pressure generator.

7. The method of producing refrigeration as defined in claim 5 including the steps of:
   (A) serially passing strong absorbent solution from said low pressure generator to said primary absorber downwardly in elevation through a plurality of successively vertically descending lower pressure refrigerant evaporating zones as said strong solution is passed to said primary absorber, thereby successively concentrating and cooling the strong absorbent solution passing to said primary absorber;
   (B) serially passing weak absorbent solution from said primary absorber to said high pressure generator downwardly in elevation through a plurality of successively vertically descending higher pressure absorbing zones as said weak solution is passed to said high pressure generator, and successively absorbing refrigerant vapor evaporated in the corresponding pressure refrigerant evaporating zones into said weak solution in said absorbing zones, thereby diluting and heating weak absorbent solution passing to said high pressure generator.

References Cited
UNITED STATES PATENTS

| | | | |
|---|---|---|---|
| 2,283,213 | 5/1942 | Katzow | 62—484 X |
| 2,755,635 | 7/1956 | Bourne | 62—101 |
| 3,175,371 | 3/1965 | Harwich | 62—101 |
| 3,266,266 | 8/1966 | Reid | 62—476 |
| 3,273,350 | 9/1966 | Taylor | 62—101 |
| 3,287,928 | 11/1966 | Reid | 62—476 X |
| 3,292,385 | 12/1966 | Murray | 62—101 |
| 3,316,727 | 5/1967 | Bourne | 62—101 |

ROBERT A. O'LEARY, *Primary Examiner.*

L. L. KING, *Assistant Examiner.*